United States Patent
Keum et al.

(10) Patent No.: US 8,392,531 B2
(45) Date of Patent: Mar. 5, 2013

(54) UNIFIED DEVICE MANAGEMENT METHOD AND SYSTEM

(75) Inventors: Ji Eun Keum, Suwon-si (KR); Sung Oh Hwang, Yongin-si (KR); Bo Sun Jung, Seongnam-si (KR); Dong Shin Jung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 666 days.

(21) Appl. No.: 12/558,191

(22) Filed: Sep. 11, 2009

(65) Prior Publication Data

US 2010/0070614 A1    Mar. 18, 2010

(30) Foreign Application Priority Data

Sep. 12, 2008 (KR) .............................. 0090332/2008

(51) Int. Cl.
*G06F 15/16* (2006.01)
*G06F 15/173* (2006.01)
*G06F 17/00* (2006.01)
*G05B 15/00* (2006.01)

(52) U.S. Cl. ............ 709/219; 709/224; 709/238; 700/1; 700/90

(58) Field of Classification Search .................. 709/219, 709/224, 238; 700/1, 90
See application file for complete search history.

(56) References Cited

U.S. PATENT DOCUMENTS

| 6,192,282 | B1 * | 2/2001 | Smith et al. ..................... 700/19 |
| 8,019,571 | B2 * | 9/2011 | Ban et al. ....................... 702/188 |
| 2002/0103597 | A1 * | 8/2002 | Takayama et al. ............ 701/200 |
| 2002/0138459 | A1 | 9/2002 | Mandal et al. |
| 2003/0038730 | A1 * | 2/2003 | Imafuku et al. .......... 340/825.24 |
| 2003/0061380 | A1 * | 3/2003 | Saito et al. .................... 709/238 |
| 2003/0191719 | A1 * | 10/2003 | Ginter et al. .................... 705/54 |
| 2007/0011446 | A1 | 1/2007 | Kato et al. |
| 2007/0118638 | A1 * | 5/2007 | Ban et al. ....................... 709/224 |
| 2007/0250212 | A1 * | 10/2007 | Halloran et al. .............. 700/245 |
| 2008/0046387 | A1 | 2/2008 | Gopal et al. |
| 2008/0209034 | A1 | 8/2008 | Shin et al. |

* cited by examiner

*Primary Examiner* — David Lazaro
*Assistant Examiner* — Vitali Korobov
(74) *Attorney, Agent, or Firm* — The Farrell Law Firm, P.C.

(57) ABSTRACT

A unified device management method and system for unified management of a fixed and mobile device includes a command execution controller which receives a device management command, sends a query message to the device, receives a response message transmitted by the device, creates a command execution policy based on the settings contained in the response message, and executes the device management command according to a policy, the device which generates and sends the response message to the command execution controller according to user inputs, and a remote access server which connects the device and the command execution controller by using a remote access protocol.

6 Claims, 8 Drawing Sheets

QueryRMSOperation()

This action returns user's response for the RMS operation as XML format
Arguments for QueryRMSOperations()

| Argument | Direction | Related State Variable |
|---|---|---|
| Response RMSoperation | OUT | RMSOperation |

FIG. 7

DeferRMSOperation

This action returns the condituin and actions as XML format based on user's indication for the queried RMS operation.

Arguments for DeferRMSOperation

| Argument | Direction | Related State Variable |
|---|---|---|
| Nowaction | IN | Operation |
| Condition | IN | Time or Event |
| Task | IN | Operation |

UNIFIED DEVICE MANAGEMENT METHOD AND SYSTEM

PRIORITY

This application claims priority under 35 U.S.C. 119 to an application entitled "UNIFIED DEVICE MANAGEMENT METHOD AND SYSTEM" filed in the Korean Intellectual Property Office on Sep. 12, 2008 and assigned Serial No. 10-2008-0090332, the contents of which are incorporated herein by reference.

BACKGROUND OF THE INVENTION

1. Field of the Invention

The present invention relates generally to a device management field and, in particular, to a device management method and system for managing fixed and mobile devices in a unified manner.

2. Description of the Related Art

Currently, various technologies are being adopted for managing fixed devices and mobile devices. The Open Mobile Alliance (OMA) has produced the OMA Device Management (OMA DM) specifications for mobile device management.

The OMA DM is a mobile device management standard specified by the OMA for device management purposes, and Customer-Premises Equipment (CPE) Wide Area Network (WAN) Management Protocol (CWMP) has been developed by the DSL Forum to standardize the WAN for CPE devices to communicate with a server.

Figure 1:
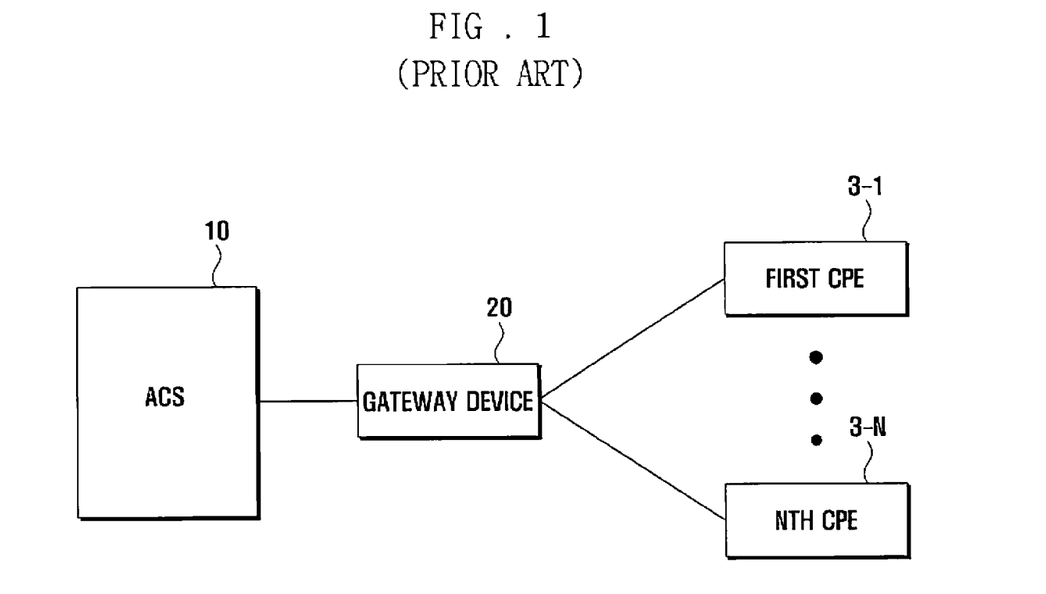
FIG. 1 illustrates a conventional network for managing fixed devices.
Figure 2:
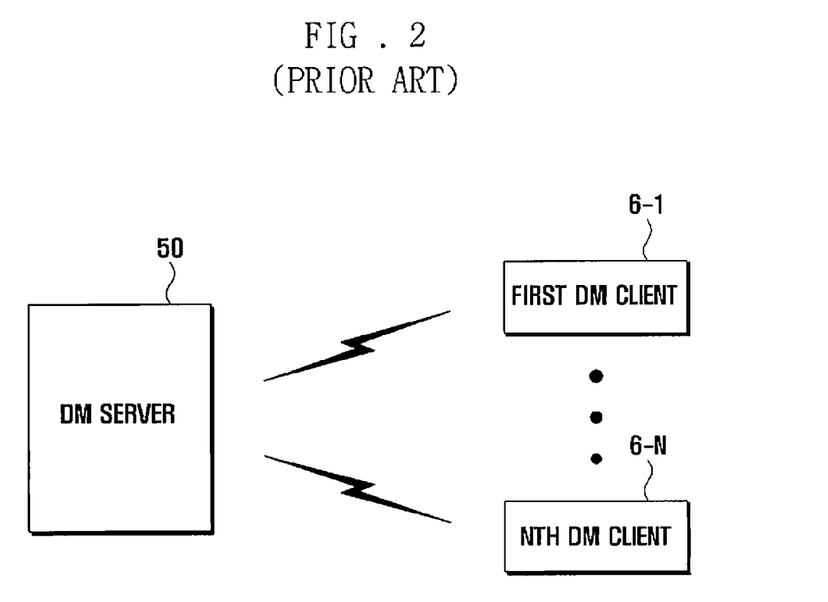
FIG. 2 illustrates a conventional network for managing mobile devices.

FIGS. 1 and 2 illustrate conventional network configurations for managing fixed and mobile devices, respectively.

FIG. 1 illustrates a configuration of the CWMP network. In FIG. 1, the CPE 1 to CPE N 3-1 to 3-N are end devices connected through DSLs, and an Auto Configuration Server (ACS) 10 is a CWMP Device Manager. The ACS 10 manages the CPEs 3-1 to 3-N via a gateway device 20.

FIG. 2 illustrates a configuration of the OMA DM network. The OMA DM network includes a DM server 50 and the first to Nth client devices 6-1 to 6-N. The OMA DM server 50 can receive, replace, and execute the management objects of the mobile devices (i.e. the client devices) by using DM protocol to manage the firmware, software, and parameters installed in the devices.

As shown in FIGS. 1 and 2, the CWMP network and the OMA DM network are similar to each other in configuration, but operate with different protocols for managing the devices and different types of management servers depending on whether the devices are connected through wired or wireless channels. Accordingly, there is a need in the art for a unified management method for the devices supporting either wired or wireless connection.

SUMMARY OF THE INVENTION

In order to overcome the problems of prior art, the present invention provides a unified device management method that is capable of managing devices connected through wired and wireless channels.

In accordance with the present invention, a device management system for a communication network includes a command execution controller which receives a device management command destined to a device, sends a query message inquiring whether to execute the device management command to the device via a remote access interface upon receipt of the device management command, receives a response message transmitted by the device in response to the query message, creates a command execution policy based on the settings contained in the response message, and executes the device management command according to the command execution policy, the device which generates the response message specifying the command execution policy and sending the response message to the command execution controller according to user inputs, and a remote access server which connects the device and the command execution controller by using a remote access protocol.

The command execution policy includes a now action field which specifies an operation to be executed upon receipt of the response message, a condition field which specifies one of conditions including a time at which an operation is triggered, a location where the operation is triggered, and an event with which the operation is operation is triggered, and a task field which specifies the operation to be executed when the condition specified in the condition field is satisfied.

The command execution controller includes a protocol converter which converts the protocol device management command received from a device management server in the format of a first protocol to the device management command in the format of a second protocol and converts the response message received from the device in the second protocol to the response message in the format of the first protocol, and a scheduler which stores the command execution policy created based on the settings contained in the response message and executes, when the condition specified in the command execution policy is satisfied, the device management command according to the command execution policy.

In accordance with the present invention, a device management method for a communication network including a command execution controller, a device and a remote access server includes sending, when the command execution controller receives a device management message, a query message inquiring whether to execute the device management command from the command execution controller to the device, sending a response message containing settings input by a user, from the device to the command execution controller, in response to the query message, and creating, at the command execution controller, a command execution policy based on the settings contained in the response message and executing the device management command according to the command execution policy.

The command execution policy includes a now action field which specifies an operation to be executed upon receipt of the response message, a condition field which specifies one of conditions including a time at which an operation is triggered, a location where the operation is triggered, and an event with which the operation is operation is triggered, and a task field which specifies the operation to be executed when the condition specified in the condition field is satisfied.

Executing the device management command includes storing the command execution policy created based on the settings contained in the response message, monitoring to detect whether a condition specified in the command execution policy is satisfied, and executing, when the condition is satisfied, an operation specified in the command execution policy.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE EMBODIMENTS

Embodiments of the present invention are described with reference to the accompanying drawings in detail. The same reference numbers are used throughout the drawings to refer to the same or like parts. Detailed descriptions of well-known functions and structures incorporated herein may be omitted for the sake of clarity and conciseness.

The terms and words used in this specification and claims shall not be understood as limited to the dictionary meaning. In the following descriptions, embodiments are disclosed for achieving the objects of the present invention. The device management method and system is described using the names of the objects specified in the Universal Plug and Play (UPnP) as a Home Network communication standard, the Technical Report 069 (TR-069) as the fixed device management protocol, and the Open IPTV Forum (OIF) standards. However, the present invention is not limited thereto and can be applied to the systems operating based on the similar technical background.

Figure 3:
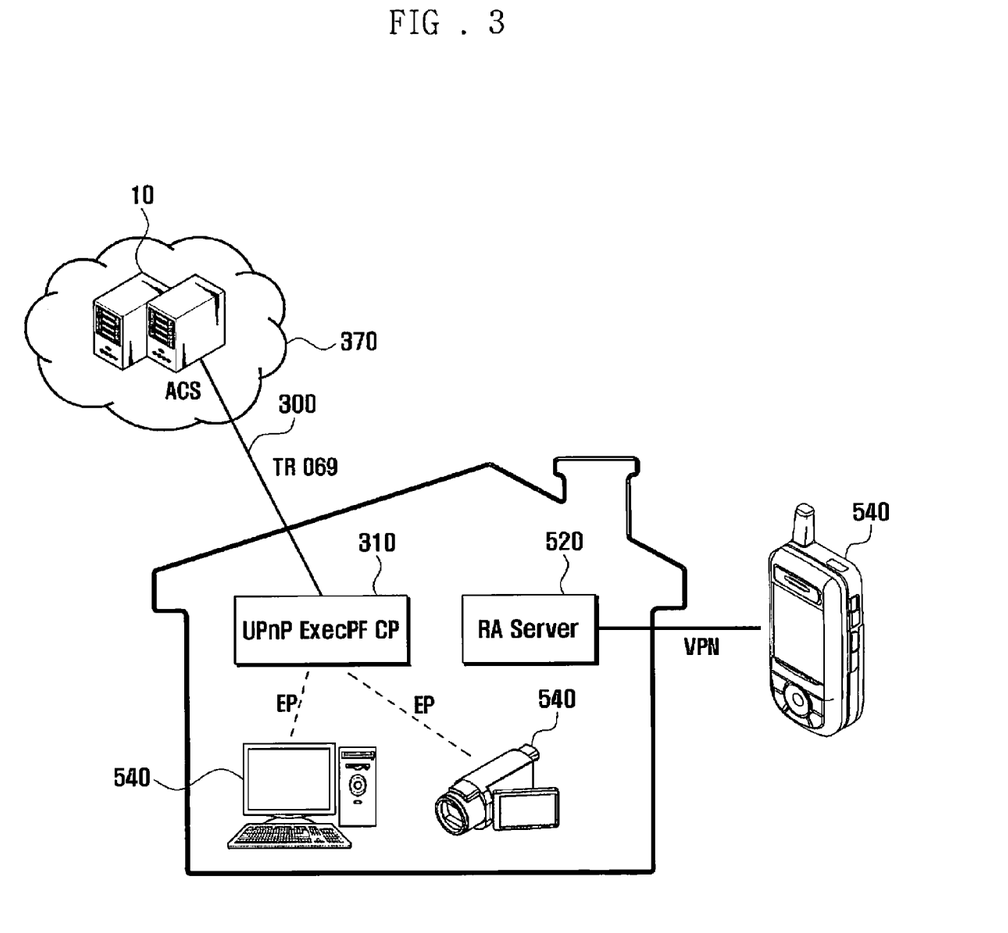
FIG. 3 illustrates a device management system according to the present invention.

FIG. 3 illustrates a device management system according to the present invention.

The device management system is configured to manage the fixed and mobile devices and includes a device management server 10 and a command execution controller (ExecPF CP) 310.

It is assumed that the device management server 10 is an Auto Configuration Server (ACS) and the command execution controller (ExecPF CP) 310 is a Universal Plug and Play Execution Platform Control Point (UPnP ExecPF CP).

Figure 6:
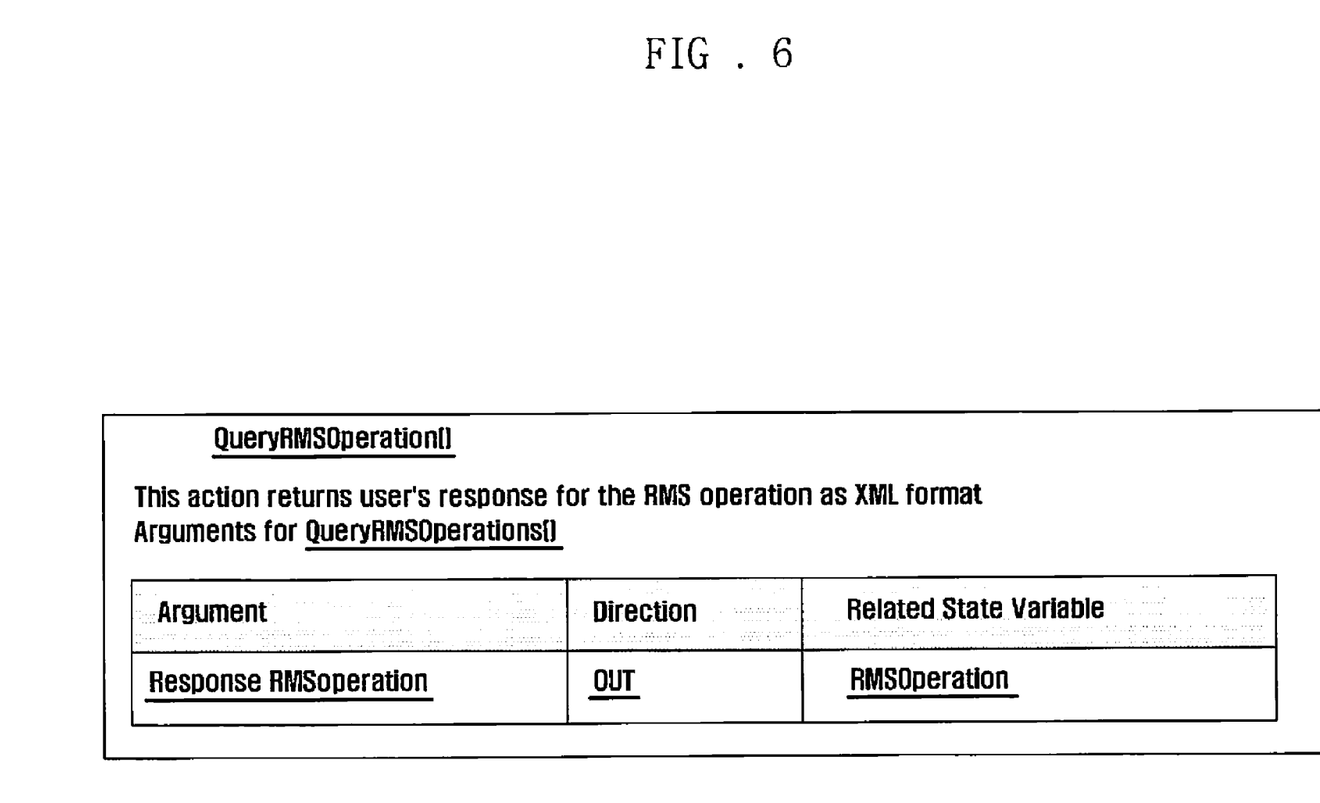
FIG. 6 illustrates a format of a query message transmitted from the device execution controller to a device for use in the device management method of FIG. 5.
Figure 7:
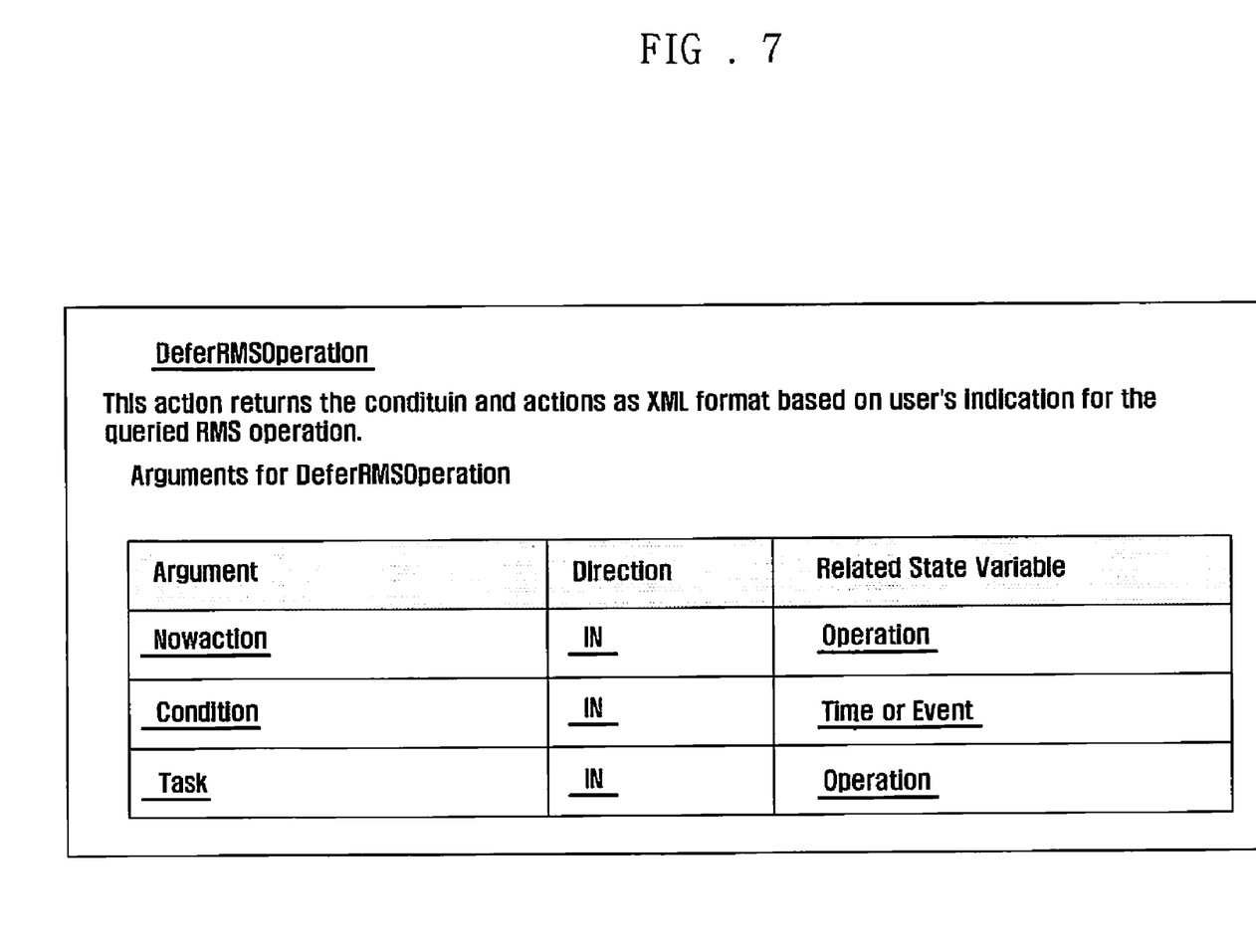
FIG. 7 illustrates a format of a response message transmitted from a device to the device execution controller in response to the query message of FIG. 6.

The device 540 supports wired and wireless connections and is equipped with an Execution Platform (EP) client 610, as shown in FIGS. 6 and 7. The EP client 610 is responsible for exchanging a query message and a response message with the command execution controller (ExecPF CP) 310. Also, the device 540 can include a Remote Access (RA) client 605, as shown in FIGS. 6 and 7, which allows the device 540 located inside the customer's premises (outdoor) to connect to the command execution controller (ExecPF CP) 310 according to the RA protocol.

The device management server 10 is the equipment located in a service provider network 370 and manages the command execution controller (ExecPF CP) 310 using the TR-069 protocol. The device management server 10 can communicate with the command execution controller (ExecPF CP) 310 located inside the customer's premises (indoor). The device management server 10 generates a device management command (including TR-069 command) for managing the devices 540 and sends the device management command to the command execution controller (ExecPF CP) 310.

The command execution controller (ExecPF CP) 310 is connected to an RA server 520 located inside the customer's premises for delivering the device management commands to the devices 540. The command execution controller (ExecPF CP) 310 delivers the device management command to the device located outside the customer's premises. At this time, the RA server 520 bridges the command execution controller (ExecPF CP) 310 to the device 540 located outside the customer's premises via a Virtual Private Network (VPN).

The command execution controller (ExecPF CP) 310 converts the TR-069 command to a UPnP command and sends the UPnP command to the devices 540.

Figure 4:
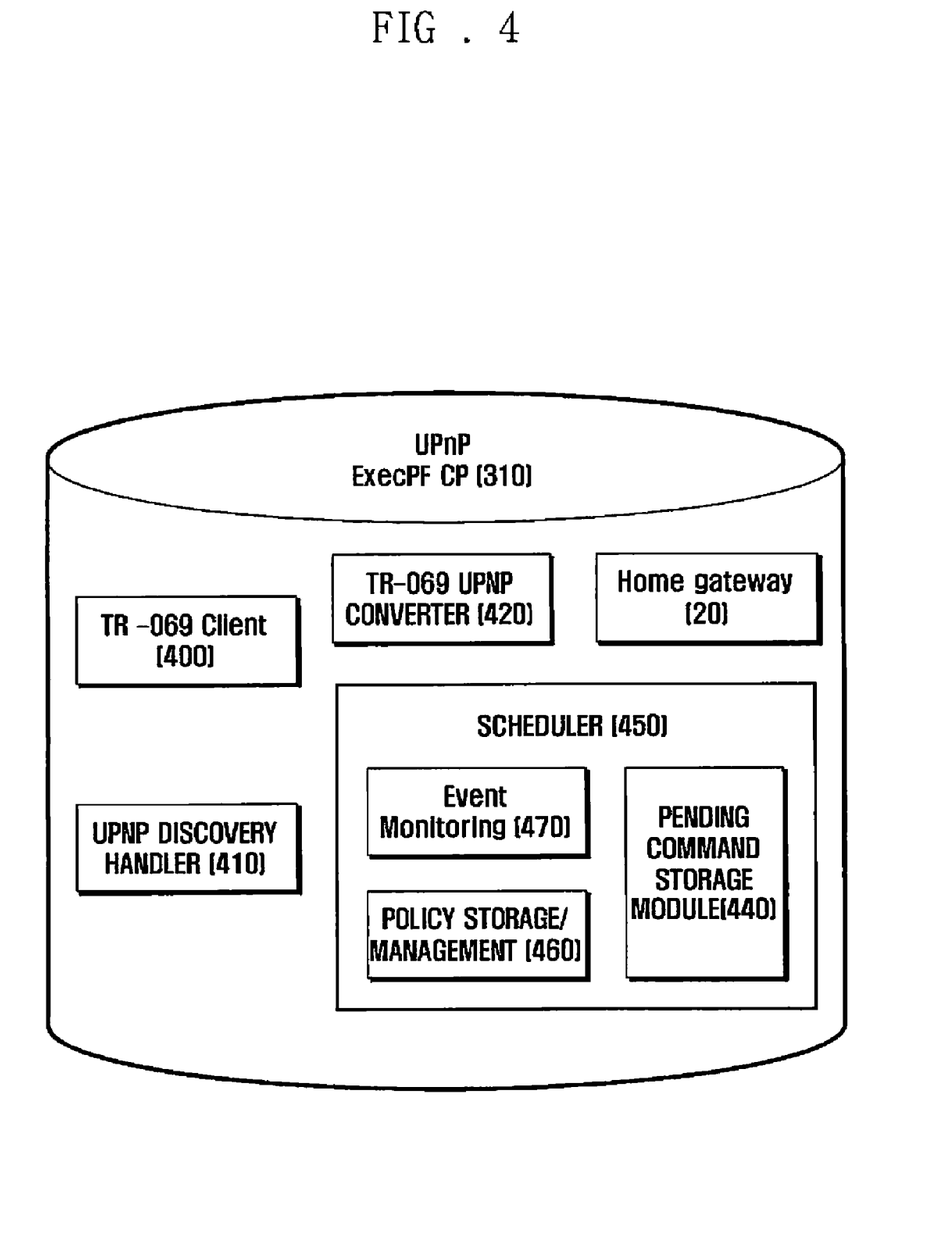
FIG. 4 illustrates a configuration of the command execution controller (ExecPF CP) of FIG. 3.

FIG. 4 illustrates a configuration of the command execution controller (ExecPF CP) 310 of FIG. 3. In FIG. 4, the command execution controller (ExecPF CP) 310 includes a home gateway 20, a management command (TR-069) client 400, a discovery (UPnP discovery) handler 410, a protocol (TR-069/UPnP) converter 420, and a scheduler 450.

The management command client 400 is a function block that is responsible for TR-069 protocol communication with the device management server 10. The management command client 400 receives, analyzes, and delivers the device management command (TR-069 command).

The discovery handler 410 manages a list of devices 540 discovered by means of the UPnP discovery mechanism.

The protocol converter 420 converts a first protocol device management command received from the device management server 10 to a second protocol device management command to be delivered to the devices 540 and converts a second protocol message received from the devices 540 to a first protocol message to be delivered to the device management server 10. For instance, the protocol converter 420 converts the TR-069 message received from the device management server 10 to the UPnP message and converts the UPnP message received from the device 540 to the TR-069 message.

The home gateway 20 is responsible for establishing a connection between the home network and an external network.

The scheduler 450 is responsible for storing the device management command execution policy, checking the conditions satisfying the command execution policy, and executing the device management command. Particularly when a response message is received, the scheduler 450 executes an operation in response to the response message according to the command execution policy.

In the present invention, the command execution policy can be a manual for controlling the devices 540. Table 1 shows a command execution policy according to the present invention.

TABLE 1

| | | Future Action | |
| --- | --- | --- | --- |
| Policy | Now Action | Condition | Task |
| 1 | Firmware download at ExecPF CP | 1 hour later | Download |
| 2 | Pending | When I come home | Command Forward |

Referring to Table 1, the policy is identified with a policy IDentifier (ID) and specifies a "now action" and a conditional "future action".

The policy ID is a value for identifying a specific policy, the "now action" specifies the action for the device 540 to execute upon receipt of the device management command, and the "future action" specifies a condition and the task for the device to execute when the condition is satisfied. Here, the condition can be set as a time, a location, or an event for triggering the task.

The scheduler 450 includes a pending command storage module 440, a policy storage/management module 460, and an event monitoring module 470.

The event monitoring module 470 monitors to determine whether the condition of the command execution policy stored in the policy storage/management module 460 is satisfied. That is, the event monitoring module 470 determines whether the time specified by a specific command execution policy approaches, the device is located as a place specified by a specific command execution policy, or an event specified by the command execution policy occurs.

The pending command storage module 440 is responsible for storing the device management command received from the device management server (ACS) 10 before a condition specified by the command execution policy is satisfied. The pending command storage module 440 also stores the command execution policy according to the response message received from the device 540.

The policy storage/management module 460 manages the devices by configuring, storing, and executing the policies set on the basis of the user's requirement indicated by the response message or the operator's requirement indicated by the device management command.

The policy storage/management module 460 manages the policies to be configured, stored, and executed in the form of Table 1.

Figure 5:
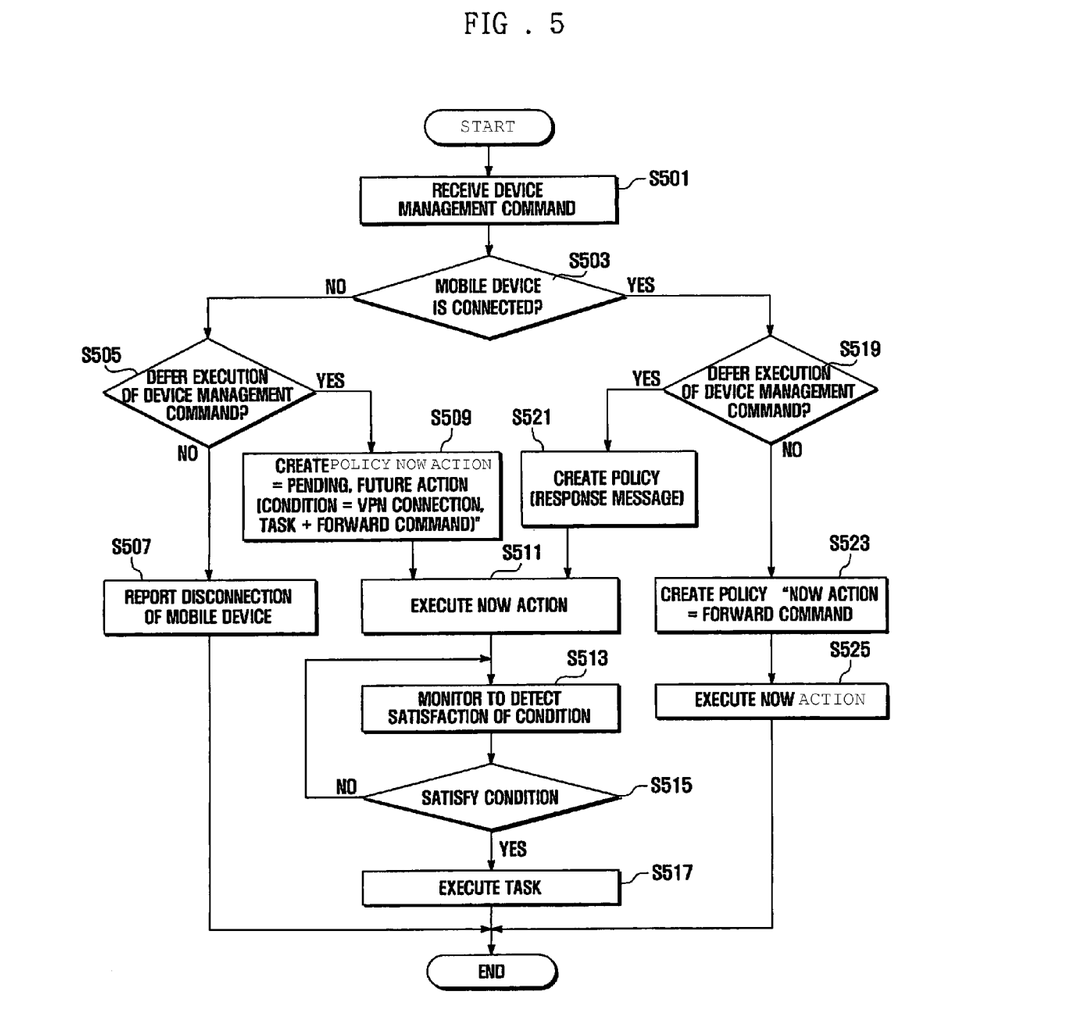
FIG. 5 illustrates a device management method according to the present invention.

FIG. 5 illustrates a device management method according to the present invention, FIG. 6 illustrates a format of a query message transmitted from the device execution controller to a device for use in the device management method of FIG. 5, and FIG. 7 illustrates a format of a response message transmitted from a device to the device execution controller in response to the query message of FIG. 6. In FIG. 5, the device 540 is capable of connecting to the command execution controller (ExecPF CP) 310 through a wired or wireless link.

Referring to FIG. 5, the device execution controller (ExecPF CP) 310 receives a device management command from the device management server (ACS) 10 as step 501.

Upon receipt of the device management command, the device execution controller (ExecPF CP) 310 determines whether a target device 540 to which the device management command is destined by using the UPnP discovery mechanism as step 503. As previously discussed, the device execution controller (ExecPF CP) 310 connects to the device via the RA server 520.

As a consequence of the UPnP discovery, if the target device 540 is not connected, the process proceeds to step 505. Otherwise, if the target device 540 is connected, the process proceeds to step 519.

At step 505, the device execution controller (ExecPF CP) 310 determines whether to defer execution of the received device management command as step 505. The command execution deferment determination is made according to the command execution policy stored in the policy storage/management module 460 of the device execution controller (ExecPF CP) 310. The command execution policy can be designated by the Service Provider (SP) or the policy stored by the user. How to store and manage the command execution policy can be determined according to the system implementation and purpose of the business.

If it is determined not to defer execution of the device management command according to the previously stored command execution policy at step 505, the device execution controller (ExecPF CP) 310 reports the device management server (ACS) 10 that the target device 540 is not connected as step 507.

Otherwise, it is determined to defer execution of the device management command, and the device execution controller (ExecPF CP) 310 creates a new command execution policy as step 509. For instance, the new command execution policy can be created in the format of "Now Action=Pending, Future Action=(Condition=VPN connection, Task=Forward Command)".

Next, the device execution controller (ExecPF CP) 310 executes the operation indicated by the "Now Action (=pending)" specified in the new command execution policy, e.g. defers the execution of the device management command as step 510. Sequentially, the device execution controller (ExecPF CP) 310 monitors to detect whether the condition (=VPN connection) specified in the new command execution policy is satisfied, i.e. whether the VPN connection event occurs as step 513. If the condition specified in the new command execution policy is satisfied as step 515, the command execution controller (ExecPF CP) 310 executes the Task (=Forward Command) specified in the new command execution policy as step 517.

Returning to step 503, if the target device 540 is connected, the command execution controller (ExecPF CP) 310 determines whether to defer execution on the received device management command by exchanging a query and response messages with the target device as step 519. That is, the command execution controller (ExecPF CP) 310 sends a query message inquiring whether to defer the execution of the device management message, and the device received the query message displays the query message for the user and sends the command execution controller (ExecPF CP) 310 a response message in response to the user input. Accordingly, the command execution controller (ExecPF CP) 310 determines whether to defer execution of the device management message in accordance with the response message.

If it is determined to defer execution of the device management command, the command execution controller (ExecPF CP) 310 creates a new command execution policy with reference to the content of the response message as step 521. That is, the command execution controller (ExecPF CP) 310 sends the target device 540 a query message and receives a response message transmitted by the target device in response to the query message. The response message contains a command execution policy set by the user.

According to the newly created command execution policy, the command execution controller (ExecPF CP) 310 executes the operation indicated by the "Now Action", i.e. executes the device management command as step 511. Next, the command execution controller (ExecPF CP) 310 monitors to detect whether the condition specified in the new command execution policy is satisfied, e.g. whether an event specified in the new command execution policy is satisfied (513). If the condition specified in the new command execution policy is satisfied as step 515, the command execution controller (ExecPF CP) 310 executes the task specified in the new command execution policy as step 517.

Otherwise, if it is determined not to defer execution of the device management command at step 519, the command execution controller (ExecPF CP) 310 creates a new command execution policy in the format of "Now Action=Forward Command" as step 523. Next, the command execution controller (ExecPF CP) 310 executes the operation indicated by the "Now Action" specified in the newly created command execution policy as step 525.

The schedule query and response messages are exchanged between the command execution controller (ExecPF CP) 310 and the device 540 via the RA server 520, and this message exchange process is described with reference to FIGS. 6 and 7. The exchange of the query and response messages is triggered by the receipt of the device management command.

Referring to FIG. 6, "QueryRMSOperation" indicates the query message transmitted from the command execution controller (ExecPF CP) 310 to the device 540 at step 519 of FIG. 5. The query message includes the device management command received from the device management server 10. Upon receipt of the query message, the device 540 displays the content of the query message for the user to make a decision.

Referring to FIG. 7, "DeferRMSOperation" indicates the response message transmitted from the device 540 to the command execution controller (ExecPF) 310 in response to the query message "QueryRMSOperation". The response message is composed of a Now Action field, a Condition field, and a Task field.

The Now Action field specifies the operation to be executed upon receipt of the response message. The Task field specifies the operation to be executed when the condition specified in the Condition field is satisfied. The Condition field specifies the Condition to execute the operation of the task specified in the Task field. Here, the condition can be a value of time at which the operation is triggered, location where the operation is triggered, or event with which the operation is triggered.

The device 540 sends the command execution controller (ExecPF CP) 310 the response message containing the values of Now Action, Condition, and Task set by the user.

As previously discussed, the command execution policy can be configured according to the user's intention.

Figure 8:
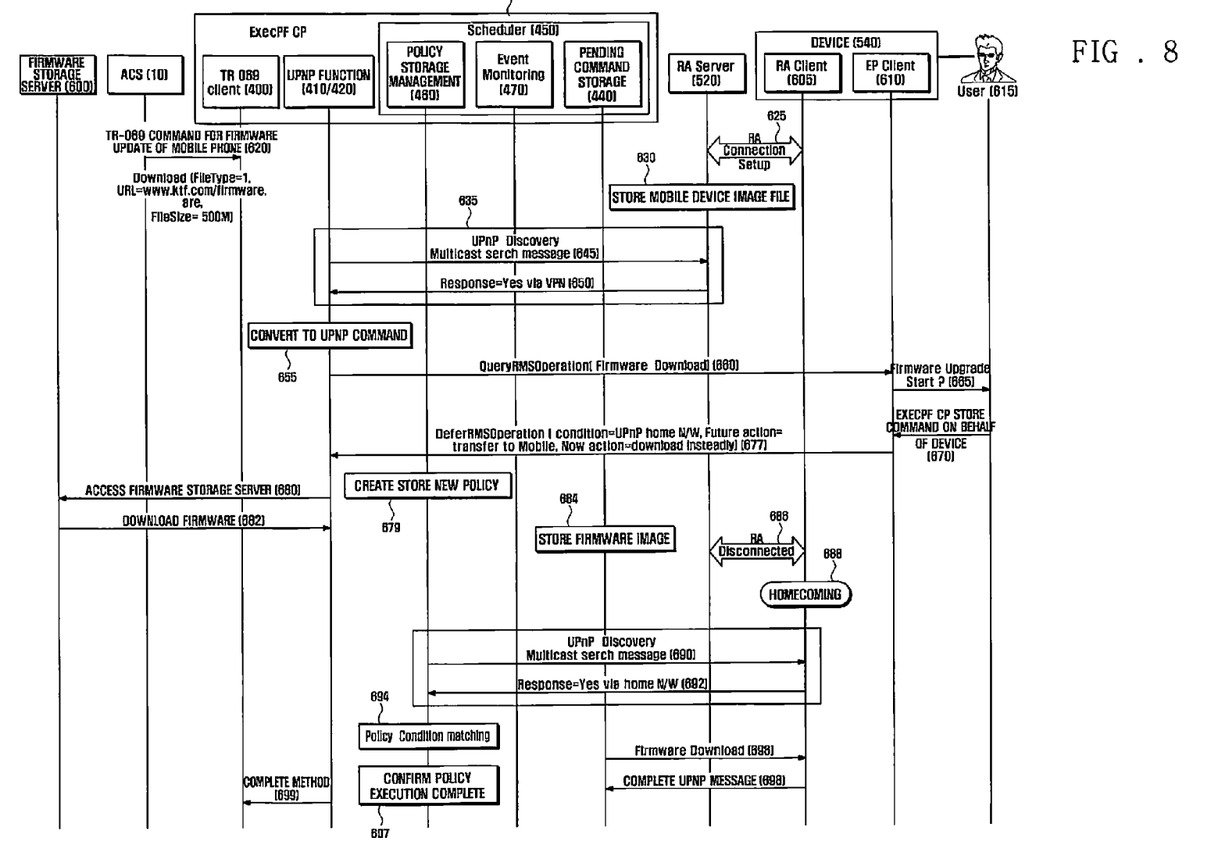
FIG. 8 illustrates operations of the device management system according to a first embodiment of the present invention.

FIG. 8 illustrates operations of the device management system according to a first embodiment of the present invention.

In FIG. 8, it is assumed that the device 540 has been connected to the command execution controller (ExecPF CP) 310 via a VPN link, and the command execution controller (ExecPF CP) 310 has received a device management command instructive of firmware upgrade.

The firmware storage server 600 stores the firmware of the devices (including device 540) to be managed on the service provider (PS) network.

The device 540 includes an RA client 605 that is responsible for connection to the RA server 520 and an EP client 610 that is responsible for exchanging the query and response messages with the command execution controller (ExecPF CP) 310.

A UPnP discovery function block 410 and an UPnP converter 420 are depicted as a combined UPnP function block 410/420 for the sake of conciseness.

Referring to FIG. 8, the device management server (ACS) 10 sends a TR-069 command instructive of firmware upgrade of a mobile phone to the command execution controller (ExecPF CP) 310 as step 620. At this time, the command execution controller (ExecPF CP) 310 receives the TR-069 command by means of the TR-069 client 400. The TR-069 command is a device management command. The device management server (ACS) 10 also sends the file size of the firmware and the Uniform Resource Locator (URL) of the firmware storage server 600 storing the firmware together with the TR-069 command.

Here, it is assumed that the device 540 is connected to the RA server 520 by means of the RA client 605 as step 625 prior to step 620. The RA server 520 connected to the device 540 acquires and stores an image file of the device 540 as step 630.

The UPnP discovery function block 410 checks the connection type of the device 540 through an UPnP discovery process as step 635. The UPnP discovery process can be performed in two steps 645 and 650. That is, the UPnP discovery function block 410 sends a multicast search message to the RA server 520 as step 645, and the RA server 520 sends a response message notifying of the VPN connection with the RA server 520 to the UPnP discovery function block 410 in response to the multicast search message as step 650.

Upon receipt of the response message, the UPnP converter 420 converts the TR_069 command received from the device management server (ACS) at step 620 to a UPnP command as step 655.

Next, the UPnP converter 420 sends the device 540 the query message ("QueryRMSOperation" method as shown in FIG. 6) containing the content of the command to information the user of the device management command as step 660.

The device 540 displays the received query message through the user interface for the user to make a decision about the execution of the device management command as step 665. The user tan enter the values of the Now Action, Condition, and Task through the user interface while viewing the query message.

The device 540 receives the values of the Now Action, Condition, and Task input by the user. In the first embodiment shown in FIG. 8, it is assumed that the user 615 sets the values of the Now Action, Condition, and Task to indicate "download the firmware (Task) when arriving home (condition) and commands the command execution controller (ExecPF OP) 310 to store the firmware provided by the service provider now (Now Action)".

Steps 665 and 670 can be performed in different order and functionality according to the implementation of the device 540.

The device 540 sends the response message ("DeferRMSOperation" method as shown in FIG. 7) containing the values set by the user 615 to the UPnP Function (410/420) of the command execution controller (ExecPF CP) 310 as step 677.

Upon receipt of the response message, the policy storage/management module 460 of the command execution controller (ExecPF CP) 310 creates a new command execution policy on the basis of values contained in the response message and stores the new command execution policy as step 679.

Once the new command execution policy is created, the command execution controller (ExecPF CP) 310 executes the operation specified by the Now Action of the new command execution policy. That is, the command execution controller (ExecPF CP) 310 downloads the firmware on behalf of the device 540. Accordingly, the command execution controller (ExecPF CP) 310 accesses the firmware storage server 600 as step 680 and downloads the firmware from the firmware storage server 600 as step 682. At this time, it is assumed that the device 540 is disconnected from the RA server 520 as step 686 and moves into the user's premises so as to be connected to the home network as step 688.

The device 540 receives a multicast search message transmitted by the command execution controller (ExecPF CP) 310 as step 690 and sends the command execution controller (ExecPF CP) 310 a reply message indicative of the connection to the home network in response to the multicast search message as step 692.

In this manner, the command execution controller (ExecPF CP) 310 discovers the device 540 through steps 690 and 692 and establishes an UPnP connection with the device 540.

Once the UPnP connection with the device 540 has been established, the command execution controller (ExecPF CP) 310 detects the event matched to the condition specified in the command execution policy as step 694 by means of the Event Monitoring module 470 of the scheduler 450.

Once the event satisfying the condition specified in the command execution policy is detected, the command execution controller (ExecPF CP) 310 executes the task that is set to be triggered when the event specified in the command execution policy occurs as step 696. That is, the command execution controller (ExecPF CP) 310 enables the device 540 to download the firmware (firmware image file stored at step 684) from the command execution controller (ExecPF CP) 310.

Once the firmware has been successfully downloaded, the device 540 sends a download complete message to the command execution controller (ExecPF CP) 310 as step 698. Upon receipt of the download complete message, the command execution controller (ExecPF CP) 310 confirms that the command execution policy is successfully executed as step 607 and sends the device management server (ACS) 10 a TR-069 command execution complete message by means of the TR-069 client 400 as step 699.

Figure 9:
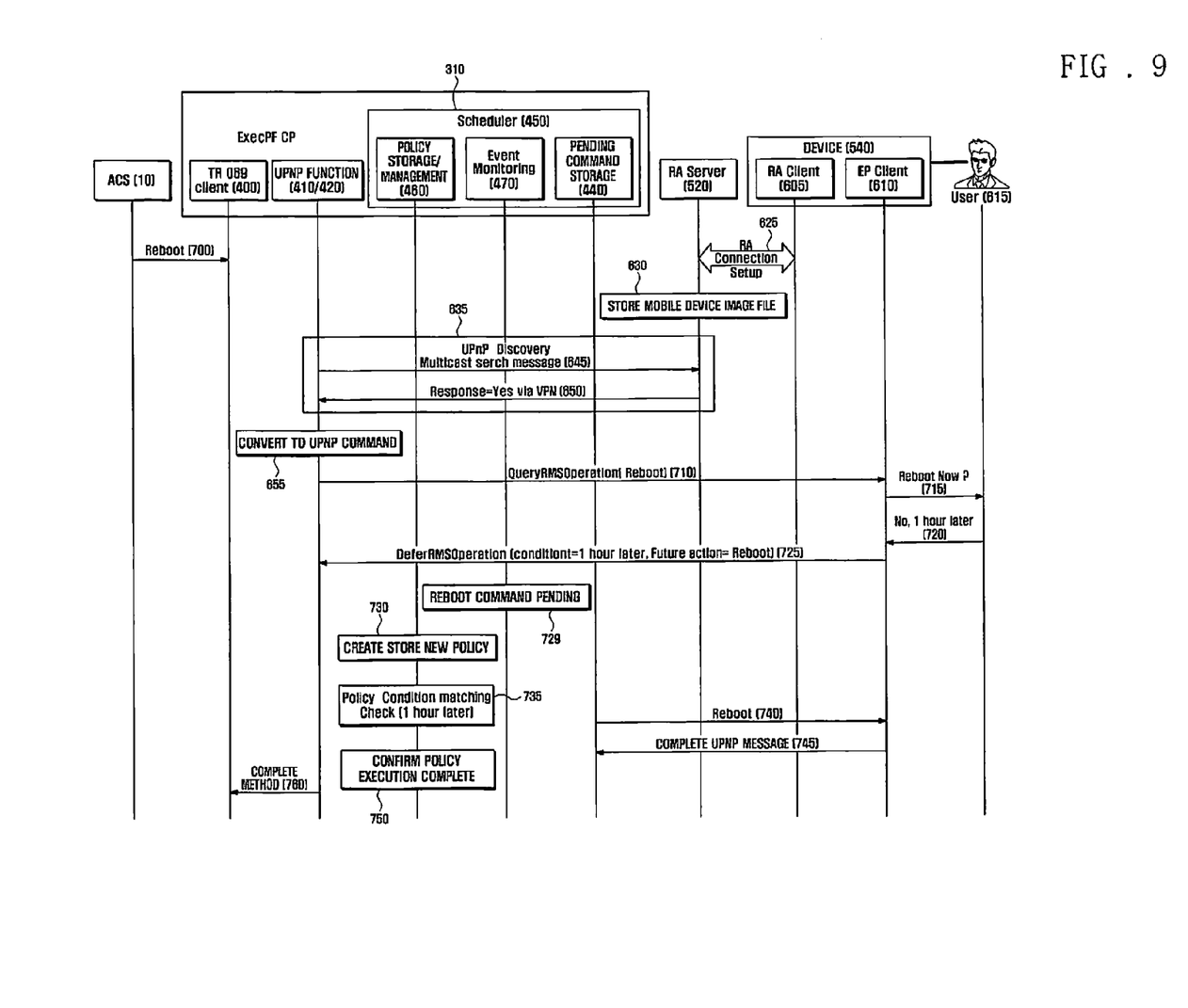
FIG. 9 illustrates operations of the device management system according to a second embodiment of the present invention.

FIG. 9 illustrates operations of the device management system according to a second embodiment of the present invention.

In FIG. 9, it is assumed that the device 540 has been connected to the command execution controller (ExecPF CP) 310 via a VPN link, and the command execution controller (ExecPF CP) 310 has received a device management command instructive of device reboot. The device 540 includes an RA client 605 that is responsible for connection to the RA server 520 and an EP client 610 that is responsible for exchanging the query and response messages with the command execution controller (ExecPF CP) 310. Also, the UPnP discovery function block 410 and UPnP converter 420 are depicted as a combined UPnP function block 410/420 for the sake of conciseness.

Referring to FIG. 9, the command execution controller (ExecPF CP) 310 receives a TR-069 command instructive of device reboot from the device management server (ACS) 10 by using the TR-060 protocol as step 700. Here, the TR-069 command is a device management command.

Here, it is assumed that the device 540 is connected to the RA server 520 by means of the RA client 605 as step 625 prior to step 700. The RA server 520 connected to the device 540 acquires and stores an image file of the device 540 as step 630.

The UPnP discovery function block 410 checks the connection type of the device 540 through an UPnP discovery process as step 635. The UPnP discovery process can be performed in two steps 645 and 650. That is, the UPnP discovery function block 410 sends a multicast search message to the RA server 520 as step 645, and the RA server 520 sends a response message notifying of the VPN connection with the RA server 520 to the UPnP discovery function block 410 in response to the multicast search message as step 650.

Upon receipt of the response message, the UPnP converter 420 converts the TR_069 command received from the device management server (ACS) at step 620 to a UPnP command as step 655 and sends the device 540 the query message ("QueryRMSOperation" method as shown in FIG. 6) containing the content of the command to information the user of the device management command as step 710.

The device 540 displays the received query message through the user interface for the user to make a decision about the execution of the device management command as step 715. That is, the device 540 displays a dialog message inquiring whether the user wants to reboot the device.

The user 615 can enter the value of the Now Action, Condition, and Task through the user interface while viewing the dialog message. In the second embodiment of the present invention, it is assumed that the values of the Now Action, Condition, and Task are set to indicate "reboot the device (Task) after 1 hour (condition)".

The device 540 sends the response message ("DeferRMSOperation" method as shown in FIG. 7) containing the values set by the user 615 to the command execution controller (ExecPF CP) 310 as step 725.

Upon receipt of the response message, the policy storage/management module 460 of the command execution controller (ExecPF CP) 310 creates a new command execution policy on the basis of values contained in the response message and stores the new command execution policy as step 730. In this case, the value of the Condition is set for "after 1 hour", and the value of the Task is set for reboot of the device without the value of the Now Action.

If 1 hour has elapsed from the receipt of the response message, the command execution controller (ExecPF CP) 310 detects the expiration of 1 hour by means of the event monitoring module 479 of the scheduler 450 as step 735. If the event satisfying the condition is detected, the command execution controller (ExecPF CP) 310 sends the device management command instructive of the device reboot to the device 540 as step 740, whereby the device 540 starts a reboot process in response to the device management command.

Once the device 540 is successfully rebooted, it sends a reboot complete message to the command execution controller (ExecPF CP) 310 as step 745. Upon receipt of the reboot complete message, the command execution controller (ExecPF CP) 310 confirms that the command execution policy is successfully executed as step 750 and sends the device management server (ACS) 10 a TR-069 command execution complete message by means of the TR-069 client 400 as step 760.

In FIGS. 8 and 9, the interfaces among the internal function blocks of the command execution controller (ExecPF CP) 310 can be configured differently according to the implementation policy. Although not depicted in the drawings, the internal function blocks of the command execution controller (ExecPF CP) 310 are interconnected with each other for appropriately performing the device management-related operations.

As described above, the device management method and system of the present invention is advantageous to manage devices connected through the wired and wireless links integrally. Particularly in consideration of the mobile of a device, the device management method and system of the present invention enables the user to manage the mobile device by using the TR-069 technology in protocol-agnostic manner.

The device management method and system of the present invention is advantageous, in view of the service provider, to enable managing the fixed and mobile devices integrally by using the TR-069 protocol, thereby simplifying the command execution controller (UPnP ExecPF CP).

The device management method and system of the present invention enables management of the devices on the wired and wireless networks by using a unified technology, resulting in reduction of implementation complexity and costs. Particularly, the device management method and system of the present invention allows the user to manage the mobile devices such as mobile phone, Personal Multimedia Player (PMP), and Motion Pictures Experts Group (MPEG) Layer Audio 3 (MP3) player integrally.

The device management method and system of the present invention is advantageous for the user to manage the mobile and fixed devices integrally with a single management technology. Furthermore, the device management method and system of the present invention allows the user to configure the command execution policy, thereby managing the devices, particularly the mobile devices on the move, in cost-effective manner.

The device management method and system of the present invention enables managing the fixed and mobile devices by using a unified management technology so as to simplify the device management, resulting in reduction of management costs and improvement of device management efficiency and user convenience.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A device management system for a communication network, comprising:
    a command execution controller for receiving a device management command device destined to a device, sending a query message inquiring whether to execute the device management command to the device via a remote access interface upon receipt of the device management command, receiving a response message transmitted by the device in response to the query message, creating a command execution policy based on the settings included in the response message, and executing the device management command according to the command execution policy;
    the device for generating the response message specifying the command execution policy and sending the response message to the command execution controller according to user inputs; and
    a remote access server for connecting the device to the command execution controller by using a remote access protocol.

2. The device management system of claim 1, wherein the command execution policy comprises:
    a now action field for specifying an operation to be executed upon receipt of the response message;
    a condition field for specifying one of conditions including a time at which an operation is triggered, a location where the operation is triggered, and an event with which the operation is operation is triggered; and
    a task field for specifying the operation to be executed when the condition specified in the condition field is satisfied.

3. The device management system of claim 1, wherein the command execution controller comprises:
    a protocol converter for converting the protocol device management command received from a device management server in the format of a first protocol to the device management command in the format of a second protocol and converting the response message received from the device in the second protocol to the response message in the format of the first protocol; and
    a scheduler for storing the command execution policy created based on the settings contained in the response message and executing, when the condition specified in the command execution policy is satisfied, the device management command according to the command execution policy.

4. A device management method for a communication network including a command execution controller, a device and a remote access server, comprising:
    sending, when the command execution controller receives a device management message, a query message inquiring whether to execute the device management command from the command execution controller to the device;
    sending a response message including settings input by a user, from the device to the command execution controller, in response to the query message; and
    creating, at the command execution controller, a command execution policy based on the settings contained in the response message and executing the device management command according to the command execution policy.

5. The device management method of claim 4, wherein the command execution policy comprises:
    a now action field for specifying an operation to be executed upon receipt of the response message;
    a condition field for specifying one of conditions including a time at which an operation is triggered, a location where the operation is triggered, and an event with which the operation is operation is triggered; and
    a task field for specifying the operation to be executed when the condition specified in the condition field is satisfied.

6. The device management method of claim 4, wherein executing the device management command comprises storing the command execution policy created based on the settings included in the response message, monitoring to detect whether a condition specified in the command execution policy, and executing, when the condition is satisfied, an operation specified in the command execution policy.

* * * * *